Dec. 19, 1950     E. G. STAUDE     2,534,536
MANUALLY CONTROLLED ELECTRIC POWER ASSISTOR
Filed Oct. 14, 1949     4 Sheets-Sheet 1

INVENTOR.
Edwin G. Staude

INVENTOR.
Edwin G. Staude

Patented Dec. 19, 1950

2,534,536

UNITED STATES PATENT OFFICE 2,534,536

MANUALLY CONTROLLED ELECTRIC POWER ASSISTOR

Edwin G. Staude, Los Angeles, Calif., assignor of one-half to Olive B. Staude, Los Angeles, Calif.

Application October 14, 1949, Serial No. 121,288

7 Claims. (Cl. 74—388)

This invention consists of a new reversible electric power assistor to amplify manual effort for accessory control operation on motor cars, trucks, busses or aircraft including steering, brakes, clutches, etc. and is an improvement on my pending application Serial No. 41,287 filed July 2, 1948.

For purposes of illustration I have shown my invention as applied for a steering assistor to manual effort when overload develops on the steering wheel and the device to be controlled can no longer be conveniently operated manually.

In my present application I have greatly reduced the cost of producing the assistor through amazing simplification over my pending application, besides providing more sensitive control through the use of an improved lost motion mechanism which transmits the torque without sliding friction and provides a simple limit stop in either direction all controlled by a single compression spring to which torque motion is applied directly instead of indirectly. I have also dispensed with the worm speed reducing gear and its huge power loss through friction and substituted therefor a spur gear train to get the required reduction with very little power loss and at less cost to produce.

I have also revised the construction of the ball or roller clutch engaging mechanism which will not engage unless the speed reducing gear is in motion.

I have also greatly simplified the electric wire connections from the movable members to the motor. To further reduce the cost I have substituted standard basic switches with over-running stroke in the electric circuit and operate same in a simple inexpensive manner requiring very small space.

Like my pending application the important feature is quick total release of the electric power assistor from manual effort where quick snappy action is essential and where control feel is to be retained and the assistor is no longer required.

This is especially important when the assistor is used in connection with power steering on motor cars where it is highly essential for parking and making short turns provided it retains the castering or centering effect of the front wheels.

In my present invention I provide a manual control shaft normally completely disconnected from the electric power assistor to eliminate all drag, and in which the power assistor only cuts in and assists in the work performed when overload develops.

Because power steering for motor cars is required for practical purposes only for parking when the ground steering wheels have to be turned while the car is standing still, which is perhaps less than 2% of the time, it is useless for the power device to remain in constant motion 98% of the time when it is not needed. Therefore I provide an inactive reversible electric power assistor to be put into action only when overload develops on the manual control shaft. This feature is of course also desirable where the power assistor is in use more frequently as in trucks or busses which require power for steering on short turns as well as for parking, etc.

It is perfectly obvious that a continuously operating power unit where something goes on all the time is a costly waste of effort which I have avoided in my present invention.

My invention is therefore an improvement over devices that use either air, vacuum, or liquid pressure all of which must be instantly displaced in the cylinders upon every movement of the steering wheel even when no power is required which therefore causes much resistance that prevents the free castering of the steering ground wheels that are constantly being urged to advance in a straight line.

Automobiles require no power steering assistance when traveling in a straight line or even when the vehicle is moving but definitely require power steering for parking, backing up and the need of turning the wheels while the vehicle is standing still.

Power steering is therefore important or necessary especially with the present trend towards wider tires with lower air pressures.

The primary object of my invention is to provide power steering with complete freedom of the steering wheel and steering shaft from the power steering assistor during normal driving without interference in any way with the free castering of the front ground wheels and without any lost motion in the steering wheel and the power output shaft.

A further object of my invention is to provide an assistor that is completely inactive in every way and only becomes active when an overload develops in the manual control means, while parking, etc.

A further important object is to provide a power assistor that will at all times remain disconnected in event of power failure or in event the power assistor becomes inoperative for any reason.

A further object is to provide a construction which permits the manual control shaft to operate faster than the electric power assistor, in which case the electric power assistor will immediately completely disengage to eliminate any drag from the electric power assistor and thus permit quick free steering manually. This is especially important because it permits total release of manual effort on the steering wheel and permits it to spin while the front wheels straighten out freely through castering the same as without any power assistor.

A further object of my invention is to provide a winding or wrapping of the electric cord around a fixed center to take up the slack which in a motor car steering wheel is four full turns or when centered two turns clockwise and two turns anticlockwise.

In order that there may be no tangling of the copper strand braided and insulated wire I provide a small chamber in which to coil and uncoil this dispensing with contact rings, brushes, etc., as shown in my pending application.

A further object is to provide an electric power mechanism that will respond instantly and revolve in either direction directly an overload develops on the manual control means and follow up with power as required.

With the use of my electric power assistor I am able to dispense with all pumps, receivers, unloading valves, piping connections and other necessary equipment required when using either air, vacuum or liquid for pressure such as cylinders, pistons, check valves, safety valves, etc.

While I have shown my invention as applied for power steering for motor cars and as such is especially efficient both as to performance and cost to produce, it is understood that this is just one of many possible applications the assistor is adapted for whether for automotive, aircraft, or any other purpose where a reversible power assistor can be used to cut in when overload develops on the manual control means.

My invention will be fully understood by reference to the following drawings and specifications in which.

Figure 1:
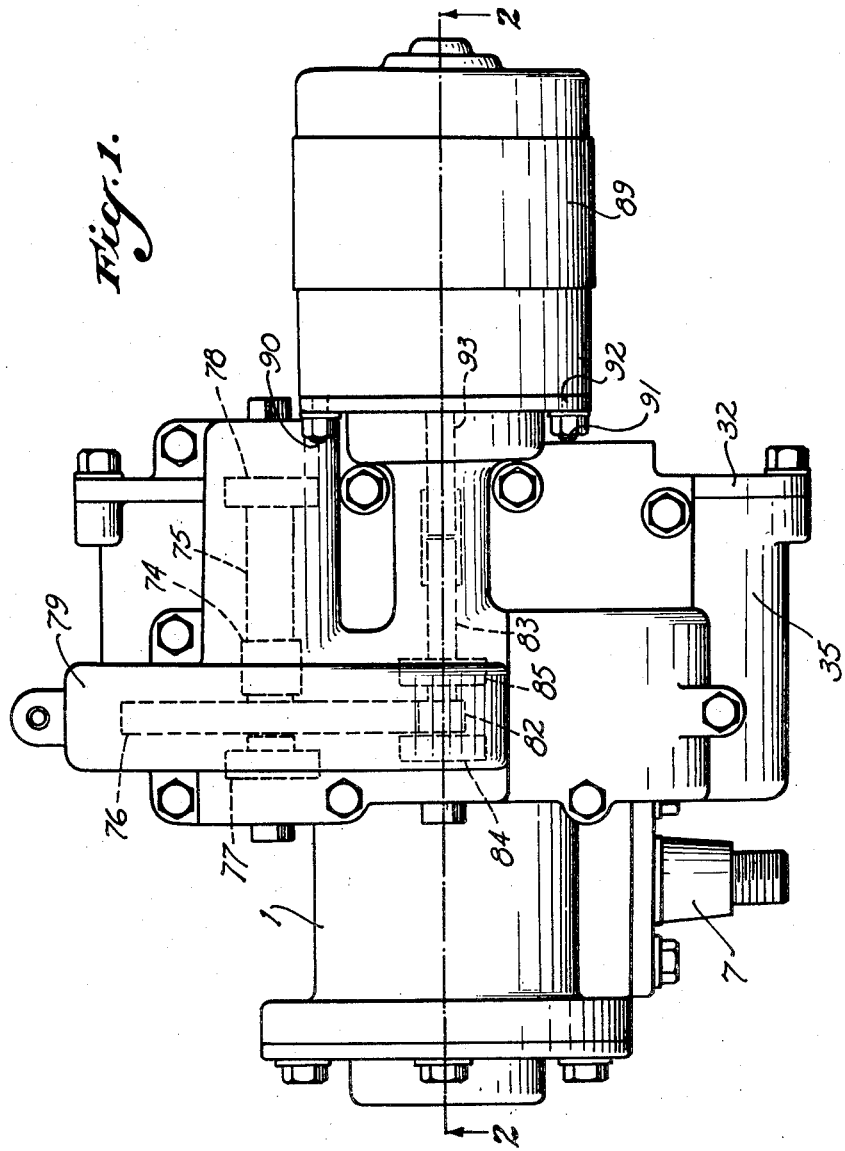
Figure 1 is a plan view of my electric reversible power assistor.
Figure 2:
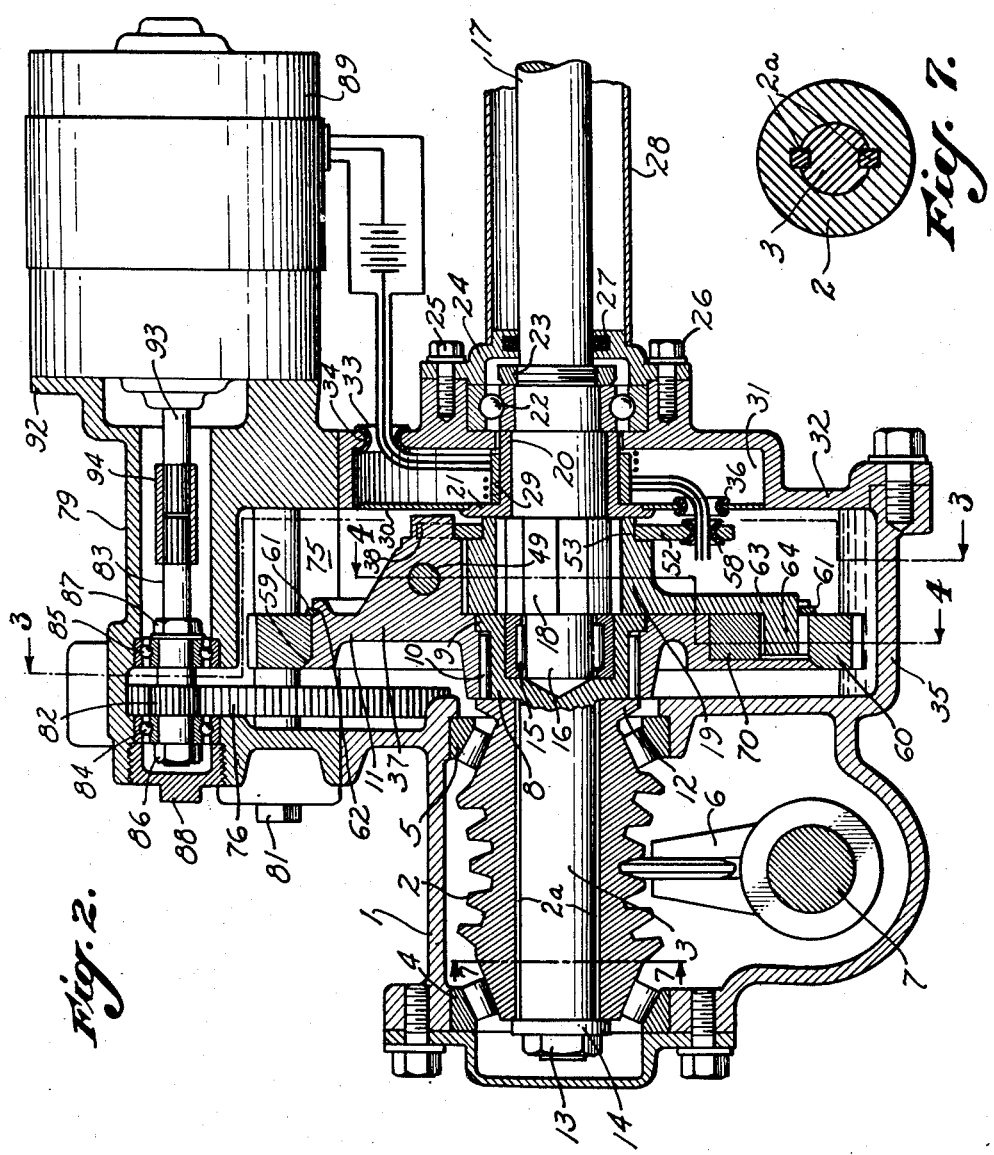
Figure 2 is a vertical section on the line 2—2 of Figure 1 and Figure 3.

Figure 7 is a section on the line 7—7 of Figure 2 showing the keys or splines connecting the worm 2 with the shaft 3.

In the drawings 1 represents a conventional steering gear housing or case having an extension 35 to enclose the power assistor within the housing 1. I mount a worm gear 2 splined to a power output shaft 3 by the key or spline 2a. The worm gear 2 is mounted in taper roller bearings 4 and 5. The worm 2 operates the anti-friction arm 6 splined to a cross shaft 7 to which is secured the usual drop arm and steering gear linkage.

The power output shaft 3 is provided with an enlarged end 8 having a flange 9 and spline members 10 adapted to receive a round Phosphor bronze disc member 11.

The round disc member 11 is clamped on the spline 10 between the flange 9 and the flange 12 on the worm 2 by a nut 13 on the threaded portion of the power output shaft 3 bearing against a washer 14 which in turn bears against the worm 2.

The enlarged end 8 of the power output shaft 3 is hollowed out to receive the needle bearing 15 which bearing supports the end 16 of the manual control shaft 17.

The manual control shaft 17 is provided with a spline portion 18 adapted to receive a member 19.

The member 19 is held in position on the spline 18 by a sleeve 20 having a flange 21.

A ball bearing 22 by means of the threaded nut 23 holds the member 19 between the sleeve 20 and the flange 9 on the power output shaft 3 without clamping so as to permit freedom to turn independently of the power output shaft 3.

A cap 24 holds the ball bearing 22 in position by means of the cap screws 25—26 tapped into the housing cover 32.

The cap 24 has the usual round oil retainer ring 27 and also acts as a support to the usual steering column 28.

A loose sleeve 29 is fitted over the sleeve 20 and a disc member 30 is welded to the flange 21.

The disc member 30 fits into an opening 31 of the housing cover 32.

The upper portion of the housing cover 32 is provided with a round hole 34 fitted with a grommet 33.

The disc member 30 is also provided with a hole and grommet 36 for purposes hereinafter described.

In order to provide an efficient lost motion device between the members 19 and the disc 11 I provide a lug 37 on the member 11. The lug 37 is provided with a round extension member 38.

On the member 19, I provide a pair of lugs 39—40.

Figure 4:
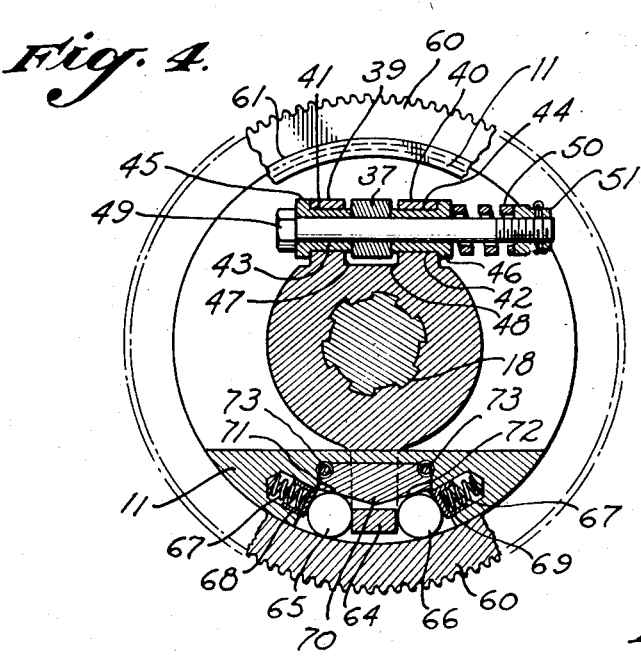
Figure 4 is a detail section on the line 4—4 of Figure 2.

The lugs 39—40 are provided with holes 41—42 to receive bushings 43—44 (see Figure 4).

The bushings 43—44 are provided with flanges 45—46 which flanges bear against the lugs 39 and 40 respectively while the bushings passing through the holes 41—42 bear against the lug 37 on the member 11.

A lost motion space 47—48 of about 3/64 inch is provided between the lugs 39 and 40 and the lug 37. A bolt 49 passes through the bushing 43, the lug 37, and the bushing 44. A spring 50 is provided over the end of the bolt 49 and adjusted to the required compression by a castle nut 51. The spring 50 is of sufficient compression so that under normal operation there is no movement in lost motion between the members 19 and 11.

When overload develops if the manual effort is clockwise with a maximum movement of 3/64 inch between the lug 39 and the lug 37 bushing 43 will contact the lug 37 against the compression of the spring 50 and create a differential of motion between the members 19 and 11 which differential is utilized to operate electric switches and also engage clutches as hereinafter described.

The basic switches 95 and 96 are kept open by internal springs and require less than 1/32 inch movement to close the circuit after which further movement on the button 56 or 57 merely overruns.

Figure 3:
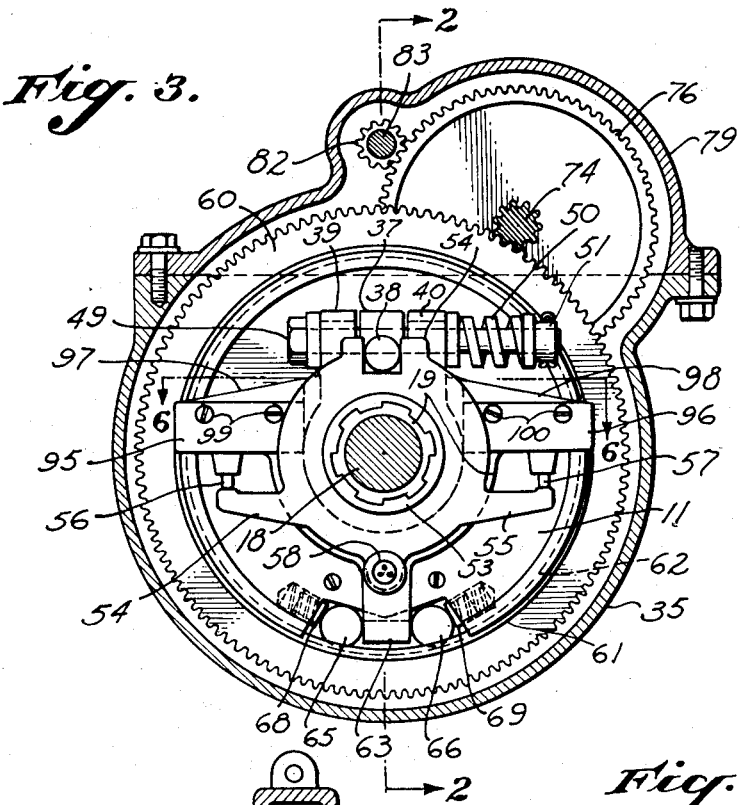
Figure 3 is a cross section on the line 3—3 of Figure 2.

In order to operate the basic conventional switches secured to extensions 97 and 98 on the member 19 by screws 99 and 100 (see Figures 3 and 6) I provide a flat disc member 52 pivoted on the hub 53 of the member 19.

The flat disc member 52 is provided with projections 54 that fit on each side of the round lug 38, on the lug 37 which is a part of the member 11.

The flat disc member 52 is also provided with arms 54 and 55 adapted to operate push buttons 56 and 57 on the switches 95—96.

The flat disc member 52 is also provided with an eyelet and grommet 58.

From the above description it is clear that a clockwise movement of the manual control shaft 17 will rock the flat disc member 52 anticlockwise because of the contact of the projections 54 with the round lug 38 and this will result in the arm 55 pressing on the switch button 57 which with proper electrical connections will cause the electrical assistor to operate in same direction as the manual effort on the member 17.

The reverse occurs when the manual control shaft is operated anticlockwise.

I will now describe the clutch mechanism and drive gears and motor connections—

The round disc member 11 is also provided with a bevel flange 59 to act as a stop for a ring gear 60 having spur gear teeth on its outer surface and running in oil.

To retain the ring gear 60 on the disc member 11 I provide a snap ring 61 fitting in a groove 62 of the round disc member 11. Except for the ball or roller clutches hereinafter described this ring gear is loose on the disc member 11 and free to revolve.

In order to control the ball or roller clutches I provide an arm 63 on the member 19 having a right angle projection 64.

The right angle projection 64 acts to separate a pair of rollers 65—66 which rollers bear against the inner surface of the ring gear 60 (see Figure 4).

Suitable springs 67 operating in cages 68—69 which fit in holes drilled in the member 11 and which bear against the rollers 65—66 and keep them constantly against the right angle projection 64.

In order to create a wedging action on the rollers 65 and 66 when a differential of motion occurs between the members 19 and 11 in either direction, I provide a hardened steel block 70 having inclined surfaces 71—72, and held in position by screws 73. Lost motion, by turning the manual control shaft 17 clockwise, will cause the right angle projection 64 to move against the roller 65 and allow the roller 66 to wedge on the incline 72 of the block 70 and thus grip the ring gear 60 and lock same to the member 11 being urged into wedging position by the spring 67 and the cage 69.

The reverse action of course takes place when the manual control shaft 17 is moved counterclockwise.

It is also clear from the description that unless there is a differential motion between the members 11 and 19 there is no possible drag of the power mechanism on the manual control shaft and therefore when used for power steering the manual control or steering wheel shaft 17 operates exactly as if no power device was connected, and therefore permits the full castering of the ground steering wheels without any roaming tendency such as is present in power devices which use oil pressure, vacuum or air in which cylinders and pistons are involved and in which the fluid contents must be moved or expelled which resists castering.

Figure 5:
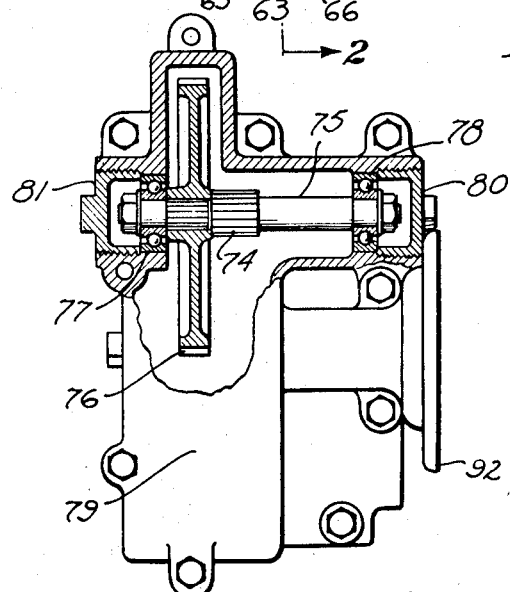
Figure 5 is a plan view of the cover of the case enclosing the mechanism with the top broken away to show the mounting of the intermediate spur gear drive.

In order to drive the ring gear 60 I provide a pinion 74 formed on a shaft 75. The shaft 75 has a gear 76 splined to it and the shaft 75 is mounted in ball bearings 77—78 which are mounted in the cap 79 to facilitate assembly; plugs 80 and 81 hold the bearing in position (see Figure 5).

The gear 76 meshes with a pinion 82 formed on a shaft 83 which shaft is mounted in bearings 84—85, locked in position by nuts 86—87 and held in position by the cap 88.

A reversible electric motor 89 having mounting bolts 90—91 is secured to a flange 92.

The motor is provided with a drive shaft 93 and is coupled with the shaft 83 by a broached sleeve 94 that fits over suitable teeth on the ends of both the shaft 83 and 93.

The ball bearings 84—85 and the motor support flange 92 are all mounted in the cap 79 (see Figures 1, 2, 3, 5).

Figure 6:
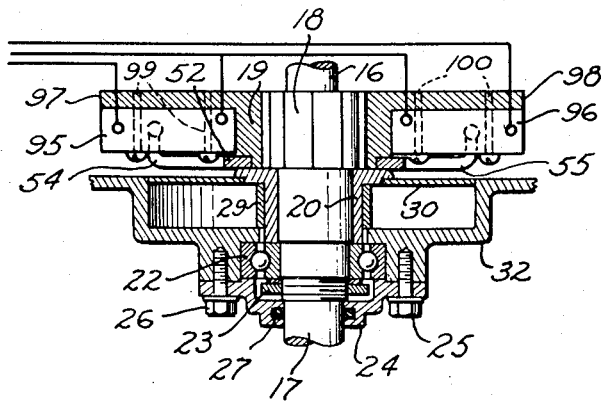
Figure 6 is a detail section on the line 6—6 of Figure 3 showing in particular the basic switch mounting and electric connections.

I will now describe the electric wiring connections from the switches to the electric motor referring to Figures 2 and 6. Since the reversible motor is a 3 wire system, I connect the two minus connections on the switches to a common wire, leaving the two outside wires for right or left motion. These three wires are threaded through the grommet 58 then through the eyelet, the grommet 36 into the opening 31 of the housing cover 32.

In ordinary practice the manual power control shaft 17 revolves 4 times to produce a 60 degree motion on the cross shaft 7, which means a wrap of the electric wires around the loose bushing 20, twice in either extreme position.

I therefore start at the in-between position when no wrap or wind is required but leave enough electric wire slack in the opening 31 of the housing cover to wrap twice around the bushing in either direction. From the opening 31 I pass the electric wires through the opening 33 and the grommet 34 to the motor and battery as shown in Figure 2.

I consider this electric connection an important part of my invention because it greatly simplifies the wiring and is therefore an important feature in cost which is a vital factor.

I claim as my invention:

1. In a manually controlled electric power assistor comprising: a manually controlled shaft; a power output shaft; a speed reducing gear for a reversible electric motor; a clutch mechanism connecting said power output shaft with said speed reducing gear arranged to operate only when said speed reducing gear is in motion, said clutch mechanism including two members locked into engagement with each other in either forward or reverse by either one of a pair of adjacent rollers operating on opposed inclined surfaces on one member, said other member having a smooth surface bearing against the said rollers and connected with the said speed reducing gears; a two member lost motion coupling, one member being a lug on said clutch member secured to the power output shaft and the other being connected to the manual control shaft; resilient means to resist differential movement between the said two member lost motion coupling; one of said lost motion coupling members being connected to control said roller clutch including an arm for engaging both the forward and reverse rollers in said clutch and both members of said lost motion coupling cooperating to control electric switches, including an oscillating member pivoted on the manual control shaft axis and operatively connected to the lug on said clutch member; said oscillating member being provided with electric switch operating arms; a pair of electric switches; electric wires connecting said switches with said reversible electric motor; means for taking up slack of said electric wires as a result of motion of said manually controlled shaft.

2. An electric power assistor comprising: a controlled shaft; a power output shaft; a speed reducing gear for a reversible electric motor; a clutch connecting said power output shaft with said speed reducing gear; means for engaging or disengaging said clutch; a lost motion coupling mounted concentric with said controlled shaft axis; resilient connections between said lost motion coupling and said clutch connected to said power output shaft; said lost motion coupling including an arm for operating said means for engaging or disengaging said clutch; an oscillating member mounted concentric with said lost motion coupling and having an operative connection with said clutch member connected with said power output shaft; electric switch controlling arms on said oscillating member; said oscillating member receiving independent motion from differential motion between said lost motion coupling and said clutch connection; a pair of electric switches; electric wires connecting said switches with said reversible electric motor; and means for taking up slack of said electric wires as a result of motion of said control shaft.

3. A manually controlled electric power assistor comprising: a manually controlled shaft; a power output shaft; a speed reducing gear for a reversible electric motor; a clutch connecting said power output shaft with said speed reducing gear; means for engaging or disengaging said clutch; a lost motion coupling connection between said manually controlled shaft and by resilient means to said clutch connected to said power output shaft; said lost motion coupling including an arm for operating said means for engaging or disengaging said clutch with said speed reducing gear through differential motion between said lost motion coupling and said resilient clutch connection; means operatively connected to said lost motion coupling and said clutch for operating electric switches for controlling forward or reverse motion to said reversible electric motor; electric wires from said switches to said reversible electric motor; means for taking up slack of said electric wires, including a chamber for said slack wire and means in said chamber for winding a part of said slack wire around the axis of said manually controlled shaft.

4. A manually controlled electric power assistor comprising: a manually controlled shaft; a power output shaft; a speed reducing gear for a reversible electric motor; a two member clutch having gripping rollers between to engage said two members to each other, one member being connected to said power output shaft and the other member to said speed reducing gear; a lost motion coupling connected to said manually controlled shaft having an arm for controlling said gripping rollers in said clutch; resilient connections for said lost motion coupling with one member of said clutch connected with said power output shaft, said connections including extensions to receive a pair of hollow bushings engaging a hollow lug secured to said clutch member connected with said power output shaft; flanges on said bushings bearing against said extensions; a bolt extending through the bushings and the hollow lug and a spring engaging the flanged end of one of said bushings and a nut on said bolt; means operatively connected to said lost motion coupling and said hollow lug on said clutch for operating electric switches through differential motion between the two members; electric switches for controlling forward or reverse motion to said reversible electric motor; electric wires from said switches to said reversible electric motor.

5. A manually controlled electric power assistor comprising: a manually controlled shaft; a power output shaft; a speed reducing gear for a reversible electric motor; a two member clutch including a pair of gripping rollers operating on opposed inclined surfaces for locking the two members together for either forward or reverse motion and arranged to engage only when said speed reducing gear is in motion; one member of said clutch being connected to said power output shaft and the other member to the said speed reducing gear; a lost motion coupling connected to the manually controlled shaft; an arm on said lost motion coupling arranged between said gripping rollers for controlling same; springs for holding said gripping rollers against said arm; said arm being of a width sufficient to prevent said gripping rollers to engage the two clutch members without differential movement; a resilient connection between said lost motion coupling and said clutch member connected with said power output shaft, to resist differential motion; means pivoted towards the axis of said manual control shaft and operatively connected with said clutch member connected with the said power output shaft for controlling electric switches through differential motion between the said pivot and said connections with said clutch member; electric switches for controlling forward or reverse motion of said reversible electric motor; electric wires from said switches to said reversible electric motor.

6. A manually controlled electric power assistor comprising: a manually controlled shaft; a power output shaft; a speed reducing gear for a reversible electric motor; a two member clutch including a pair of gripping rollers between said two member clutch and operating on opposed inclined surfaces for locking the two members together for either forward or reverse motion and arranged to engage only when the said speed reducing gear is in motion; one of said clutch members being connected to the power output shaft and the other clutch member being connected to the speed reducing gear; a lost motion coupling connected to the manually controlled shaft; an arm on said lost motion coupling arranged between said gripping rollers for controlling same; springs for holding said gripping rollers against said arm; said arm being of a width sufficient to prevent said gripping rollers from engaging the two clutch members without differential movement; a resilient connection between said lost motion coupling and said clutch member connected with said power output shaft, to resist differential motion; means pivoted towards the axis of said manual control shaft and operatively connected with said clutch member connected with said power output shaft for controlling electric switches through differential motion between the said pivoted connection and said connections with said clutch member; electric switches for controlling forward or reverse motion of said reversible electric motor; electric wires from said switches to said reversible electric motor; means for taking up slack electric wire as a result of motion from said manual control shaft.

7. An electric power steering assistor comprising; a manually operable steering shaft; a manual and power output shaft; connections for an intermittently operable reversible electric motor with said manual and power output shaft, including a clutch; electric switches for controlling said intermittently operable electric motor, including an electric wire circuit; a lost motion coupling connecting said manually operable steering shaft with said manual and power output shaft; means associated with said lost motion coupling as a result of differential motion for operating said switches and said clutch; means for taking up slack in said electric wire circuit.

EDWIN G. STAUDE.

REFERENCES CITED

The following references are of record in the file of this patent:

UNITED STATES PATENTS

| Number | Name | Date |
|---|---|---|
| 2,311,010 | Vickers | Feb. 16, 1943 |